United States Patent
Zhou et al.

(10) Patent No.: US 12,267,927 B1
(45) Date of Patent: Apr. 1, 2025

(54) AMBIENT LAMP AND INSTRUCTION TRANSMISSION/APPLICATION METHOD THEREOF, AND STORAGE MEDIUM

(71) Applicant: Shenzhen Intellirocks Tech. Co., Ltd., Shenzhen (CN)

(72) Inventors: Jie Zhou, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/927,435

(22) Filed: Oct. 25, 2024

(30) Foreign Application Priority Data

Nov. 24, 2023 (CN) .......................... 202311583445.2

(51) Int. Cl.
*H05B 47/105* (2020.01)
*H04L 67/12* (2022.01)

(52) U.S. Cl.
CPC ............ *H05B 47/105* (2020.01); *H04L 67/12* (2013.01)

(58) Field of Classification Search
CPC .............................. H05B 47/105; H04L 67/12
See application file for complete search history.

(56) References Cited

U.S. PATENT DOCUMENTS

2018/0041561 A1* 2/2018 Davies .................. H04L 65/762
2021/0243383 A1* 8/2021 Huang .................. G06V 10/806

FOREIGN PATENT DOCUMENTS

CN 102158713 A 8/2011

* cited by examiner

*Primary Examiner* — Minh D A
(74) *Attorney, Agent, or Firm* — Wenye Tan

(57) ABSTRACT

An instruction transmission method is provided for an ambient lamp. The method includes: sequentially obtaining a playback frame from a playback frame sequence as a current playback frame; determining a target encoding scheme of the current playback frame based on a frame type of the current playback frame; determining effective data and a data type of the effective data of the current playback frame according to the target encoding scheme, and encoding the effective data into playback encoded data; and encapsulating the playback encoded data of the current playback frame and the data type of the effective data into a lighting-effect playback instruction, and transmitting the lighting-effect playback instruction to a control chip of a lighting component of the ambient lamp for execution.

10 Claims, 8 Drawing Sheets

Identify and determine the frame type of the current playback frame. The frame type is any one of a key frame, a prediction frame, and a special frame, the key frame indicates that the current playback frame includes independent and complete data, the prediction frame indicates that the current playback frame includes data that can be transformed by the adaptive motion vector data of its previous adjacent playback frame, and the special frame indicates that the current playback frame includes other types of data that are not the key frame and the prediction frame — S5210

If the frame type of the current playback frame is key frame, the target encoding scheme of the current playback frame is determined to be the original image encoding scheme, and the original image encoding scheme is set to encode the original data of the current playback frame as effective data to obtain the corresponding playback encoded data — S5220

If the frame type of the current playback frame is a prediction frame, the target encoding scheme of the current playback frame is determined to be the vector encoding scheme, and the vector encoding scheme is set to encode the motion vectors of the current playback frame relative to its previous adjacent playback frame as effective data to obtain the corresponding playback encoded data — S5230

If the frame type of the current playback frame is a special frame, the target encoding scheme of the current playback frame is determined to be the trial calculation encoding scheme, and the trial calculation encoding scheme is set to select the one with the smallest data amount from the two playback encoded data obtained by trial calculation as the playback encoded data of the current playback frame, and the two playback encoded data are respectively encoded with the original data of the current playback frame and the frame difference data between the current playback frame and its previous adjacent playback frame as the trial calculation effective data — S5240

FIG. 5

AMBIENT LAMP AND INSTRUCTION TRANSMISSION/APPLICATION METHOD THEREOF, AND STORAGE MEDIUM

CROSS-REFERENCES TO RELATED APPLICATIONS

This application claims priority to Chinese Patent Application No. CN2023115834452, filed on Nov. 24, 2023, the content of which is hereby incorporated by reference in entirety.

FIELD OF THE TECHNOLOGY

The present disclosure relates to the technical field of lighting technology and, specifically, to an ambient lamp and instruction transmission/application method thereof, and storage medium.

BACKGROUND OF THE DISCLOSURE

As a kind of intelligent lamp, the ambient lamp can play the role of decorating the indoor spaces and displaying information. With the improvement of people's economic conditions, the ambient lamp is becoming more and more popular. One of the functions of the ambient lamp is to, according to a given series reference images, generate a lighting effect corresponding to the light effect of the series reference images, so as to enhance the environmental atmosphere.

An example of the ambient lamp is an ambient lamp for forming a predetermined pattern or text on a curtain. The user generally sets the information of the pattern or text to be displayed on the lighting component of the ambient lamp through a terminal device, such as an application software on a mobile phone, and then transmits the pattern or text information to the controller of the ambient lamp, and generates corresponding playback encoded data through the controller to form a corresponding lighting-effect playback instruction, which is then transmitted to the control chip of the lighting component of the ambient lamp for execution, so as to control each lamp bead in the lighting component to emit a predetermined light according to the acquired pattern or text information, so as to form a corresponding pattern or text on the curtain.

Ambient lamps usually use embedded chips to implement their business logic. For example, a control chip with Bluetooth or WiFi communication function is used in the controller, and a more economical control chip such as a single-chip microcomputer is used in its lighting component. The control chip of the controller is connected to the control chip in the lighting component through a serial interface. Taking the UART interface as an example, its baud rate is usually 921600 bit/s. When the controller needs to transmit image data to the lighting component, in order to make the lighting effect refresh frequency of the lighting component reach 30 ms/every refresh, the maximum transmission data volume of UART must be less than 4 KBtye/s. In practical applications, the number of lamp beads in the lighting component is large, for example, up to 1560 lamp beads, and each lamp is divided into three RGB color values. The overall RGB color value is 2000*3 Btye=6000 Bytes.

Thus, when the number of lamp beads in the ambient lamp is greater than 4000/3, the controller needs to compress the playback encoded data to effectively control the lighting component to achieve high refresh rate to play lighting effects. However, if directly applying a certain encoding algorithm to compress the playback encoded data with a unified encoding scheme, because the playback encoded data is essentially also a kind of image data, in this case, it is often impossible to take into account both compression efficiency and image data quality. Therefore, according to the present disclosure, in order to ensure efficient data transmission between the control chip of the controller and the control chip of the lighting component, it is desired to adapt to the specific software and hardware environment of the ambient lamp and propose a more effective solution.

The disclosed methods and apparatus are directed to solve one or more problems set forth above and other problems.

SUMMARY

Embodiments of the present disclosure provides an ambient lamp and instruction transmission/application method thereof, and storage medium.

According to one aspect of the present disclosure, an instruction transmission method for provided for an ambient lamp. The method includes: sequentially obtaining a playback frame from a playback frame sequence as a current playback frame; determining a target encoding scheme of the current playback frame based on a frame type of the current playback frame; determining effective data and a data type of the effective data of the current playback frame according to the target encoding scheme, and encoding the effective data into playback encoded data; and encapsulating the playback encoded data of the current playback frame and the data type of the effective data into a lighting-effect playback instruction, and transmitting the lighting-effect playback instruction to a control chip of a lighting component of the ambient lamp for execution.

According to another aspect of the present disclosure, an instruction application method is provided for an ambient lamp. The method includes: receiving a lighting-effect playback instruction transmitted by a controller of an ambient lamp, wherein the lighting-effect playback instruction includes playback encoded data corresponding to a current playback frame for playing a lighting effect and a data type corresponding to effective data having been encoded to obtain the playback encoded data; decoding the playback encoded data according to the data type of the effective data to obtain effective data of the current playback frame; according to the data type of the effective data, applying a restoration algorithm corresponding to the data type to restore original data of the current playback frame based on the effective data; and controlling the lighting component to play the lighting effect corresponding to the current playback frame according to the original data.

According to another aspect of the present disclosure, an ambient lamp is provided. The ambient lamp includes a central processing unit and a memory. The central processing unit is configured to execute a computer program stored in the memory to perform an instruction transmission method. The method includes: sequentially obtaining a playback frame from a playback frame sequence as a current playback frame; determining a target encoding scheme of the current playback frame based on a frame type of the current playback frame; determining effective data and a data type of the effective data of the current playback frame according to the target encoding scheme, and encoding the effective data into playback encoded data; and encapsulating the playback encoded data of the current playback frame and the data type of the effective data into a lighting-effect playback instruction, and transmitting the lighting-effect playback instruction to a control chip of a lighting component of the ambient lamp for execution.

Compared with existing technologies, the present disclosure sequentially obtains the playback frame used to control the lighting component to play the lighting effect of the corresponding frame as the current playback frame, analyzes the frame type of the current playback frame, distinguishes different frame types to determine the corresponding target encoding scheme, obtains the effective data corresponding to the current playback frame, encodes only the effective data to obtain the playback encoded data corresponding to the current playback frame, and encapsulates the playback encoded data together with the data type of its effective data as the lighting-effect playback instruction corresponding to the current playback frame, and transmits it to the control chip of the lighting component of the ambient lamp for corresponding decoding and application, so as to realize the control of the lighting component to play the lighting effect corresponding to the current playback frame. Thus, the current playback frame is flexibly encoded according to the corresponding target encoding scheme according to different frame types, ensuring that the optimal encoding scheme can be used for each frame type to realize the encoding of the current playback frame, which can optimize the encoding efficiency, and then effectively expand the scale of the playback frames passing through the data transmission channel, so that the embedded chip can transmit the lighting-effect playback instruction more efficiently, and transmit more frames of playback encoded data in a unit time. After the corresponding decoding, it can be quickly applied to realize the lighting-effect playback of the corresponding frame, effectively improving the refresh rate of the lighting component when playing the lighting effect, making the lighting effect more delicate and natural.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

FIG. 5 illustrates a flow diagram of determining the target encoding scheme based on the frame type according to an embodiment of the present disclosure;

DETAILED DESCRIPTION

The ambient lamp of the present disclosure can decorate the atmosphere of various spaces, and can also disseminate information by emitting light in an array format to form patterns or texts. Of course, the ambient lamp also has a certain degree of luminous function, and is often installed in indoor spaces.

Figure 1:
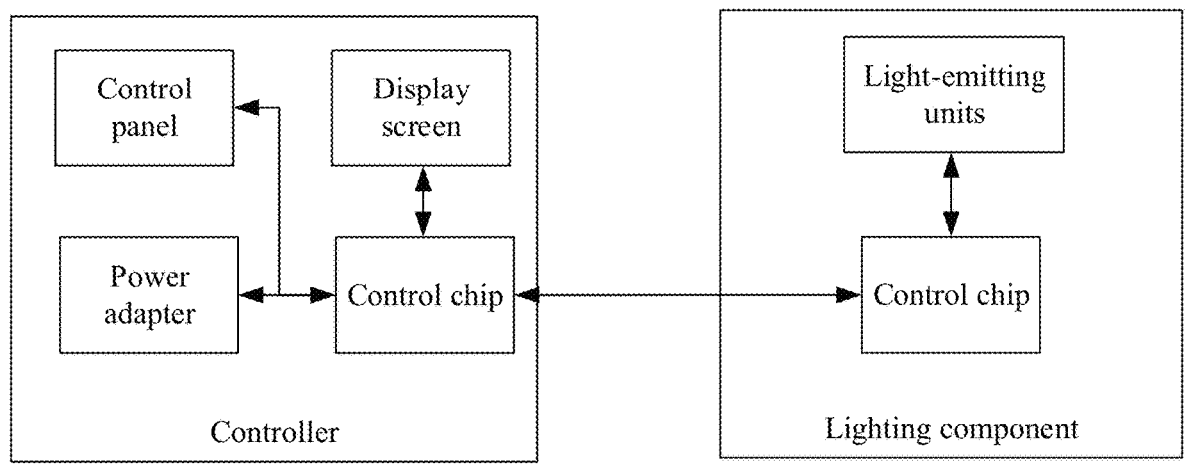
FIG. 1 illustrates a schematic diagram of an electrical structure of an ambient lamp according to an embodiment of the present disclosure.

As shown in FIG. 1, the ambient lamp may include a controller and a lighting component. The controller of the ambient lamp has a built-in control chip, which usually has a corresponding communication component to communicate with an external terminal device and receive external data transmitted by the terminal device, such as a lighting effect animation file used to generate a corresponding lighting effect. The control chip of the controller can also be responsible for converting the original image frames provided by the lighting effect animation file into the playback encoded data of the corresponding frames, encapsulating the playback encoded data into a lighting-effect playback instruction, and sending the lighting-effect playback instruction to the lighting component to control the lighting-effect playback. The lighting component in the ambient lamp also has a built-in control chip, which is responsible for receiving the lighting-effect playback instruction transmitted by the controller, decoding and restoring the original data of the corresponding frames according to the playback encoded data therein, and using the original data as the playback encoded data to control the light-emitting units in the lighting component to play the lighting effect of the corresponding frame. In certain embodiments, multiple lighting components may be included.

The control chip of the controller and/or the control chip of the lighting component can be implemented by various embedded chips, such as Bluetooth SoC (System on Chip), WiFi SoC, DSP (Digital Signal Processing), MCU (Micro Controller Unit, commonly known as single-chip microcomputer) and other types of chips. Among them, in order to adapt to the situation that the controller needs to couple to the communication component, the control chip can be preferably Bluetooth SoC or WiFi SoC. The control chip of the lighting component can be preferably MCU or DSP for economic advantages. In this regard, the selection can be flexible and does not affect the creative spirit of the present disclosure.

The control chip usually includes a central processing unit and a memory. The memory and the central processing unit are used to store and execute program instructions respectively to realize corresponding functions. The communication component in the control chip can be used to communicate with external devices, for example, it can communicate with a personal computer or various smart terminal devices, so that after the user issues various configuration instructions and lighting effect animation files through the user's terminal device, the control chip can receive them through the communication component and further use them.

The controller can also be configured with certain components, such as a power adapter, a control panel, and a display screen, etc., as needed. The power adapter is mainly used to convert the mains power into direct current to power the entire ambient lamp. The control panel usually provides one or more buttons for implementing switch control of the controller, and selecting various preset lighting effect animation files, etc. The display screen can be used to display various control status information, so as to cooperate with the buttons in the control panel to support the realization of human-computer interaction functions. In some embodiments, the control panel and the display screen can be integrated into a same touch screen.

The lighting component is usually composed of a large number of light-emitting units, each of which can independently control its light emission. Thus, for the lighting component, in addition to the control chip that communicates with the controller as described above, each light-emitting unit of the lighting component is usually also equipped with a corresponding control chip. The control chip of the lighting component with a communication role can, according to a preset communication protocol, transmit the original data of the corresponding frame generated according to the lighting-effect playback instruction as the playback encoded data to the control chip of each light-emitting unit, so as to control the control chip of each light-emitting unit to control the light emission of its own light-emitting element, according to the control data corresponding to itself in the playback encoded data.

In terms of product form, the ambient lamp of the present disclosure can be designed as a specific device of different forms, such as a curtain lamp, or a splicing lamp, etc.

Figure 2:
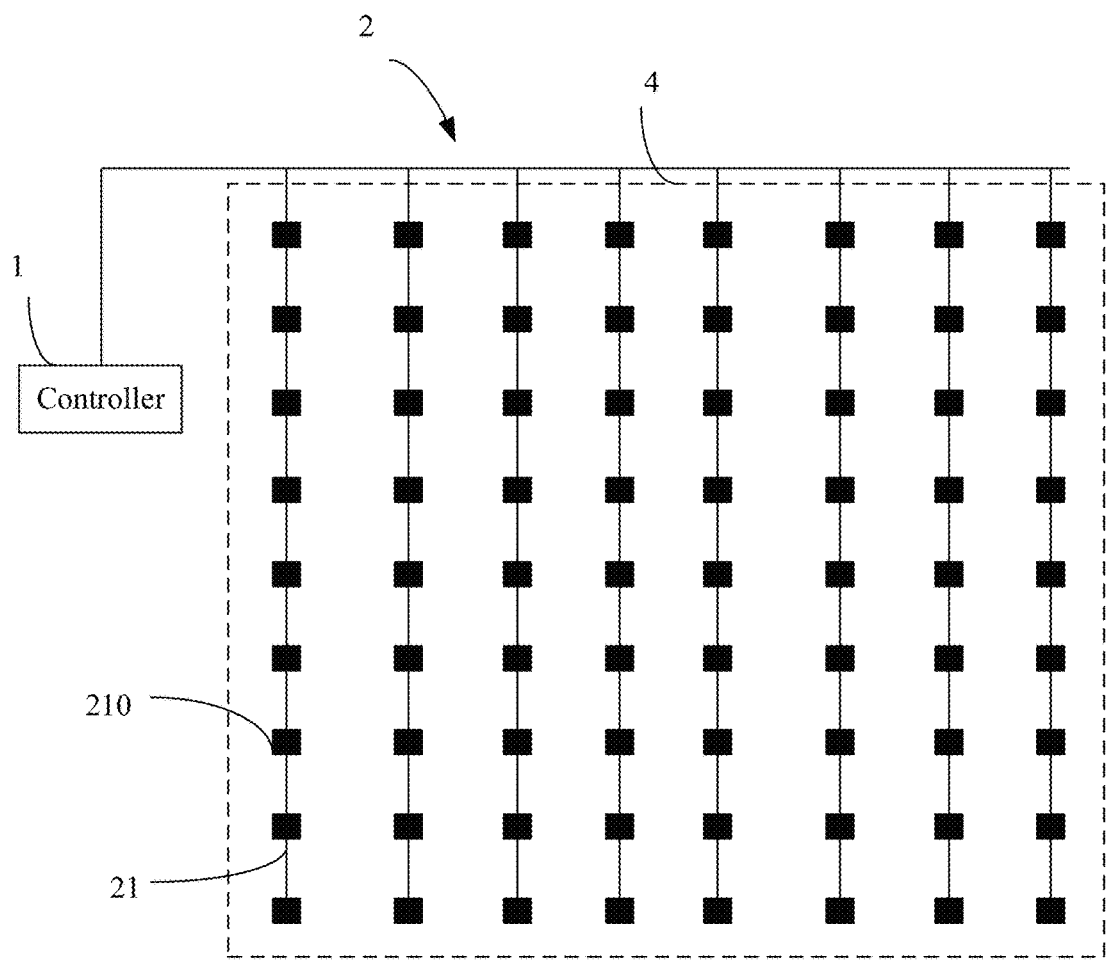
FIG. 2 illustrates a schematic diagram of an electrical structure of an curtain lamp according to an embodiment of the present disclosure.

For example, the product form of a curtain lamp is shown in FIG. 2. As shown in FIG. 2, the lighting component of the curtain lamp is implemented in the form of a curtain lighting component. The curtain lighting component 2 includes a plurality of light strips 21 connected to the bus coupled to the controller, each light strip 21 includes a plurality of lamp beads 210 connected in series as light-emitting units, and usually the number of lamp beads 210 in each light strip 21 is the same and the light strips 21 are arranged at equal intervals. When the curtain lighting component 2 is in use, the light strips 21 are usually unfolded according to the layout shown in FIG. 2, so that all the lamp beads in all the light strips 21 are arranged in an array to form a lamp bead matrix structure. When emitting light in coordination, the lamp beads can provide an effect of an image frame. Thus, the surface where the entire lamp bead matrix structure is located constitutes a surface array and, when the lighting effect is played, a certain graphic effect can be formed within the range of the surface array. When a single picture is displayed statically, it is a static lighting effect, and when pictures are switched in sequence, a dynamic lighting effect can be formed.

Each light strip 21 can be composed of a plurality of lamp beads 210 connected in series. The lamp beads 210 in the same light strip 21 are provided with the operational electrical current through a same set of cables connected to the bus. The lamp beads 210 in the same light strip 21 can be connected in parallel in terms of electrical connection. In one embodiment, the light strips 21 in the same lamp bead matrix structure can be arranged at equal intervals along the bus direction, and the number and positions of the lamp beads 210 in each light strip 21 are also arranged accordingly. In this way, the surface array 4 composed of the entire display frame plays a similar role to a display screen when viewing its lighting effect from a distance, and can have a picture effect in the human eyes.

The lighting component of the curtain lamp can be equipped with the control chip that plays a centralized control role, which is used to communicate with the controller 1, parse the lighting-effect playback instructions transmitted by the controller 1 into playback encoded data, and send it to each light-emitting unit. Correspondingly, each light-emitting unit is also equipped with a corresponding control chip, which is used to control the internal light-emitting element to emit light according to the control data corresponding to the light-emitting unit itself in the playback encoded data.

Figure 3:
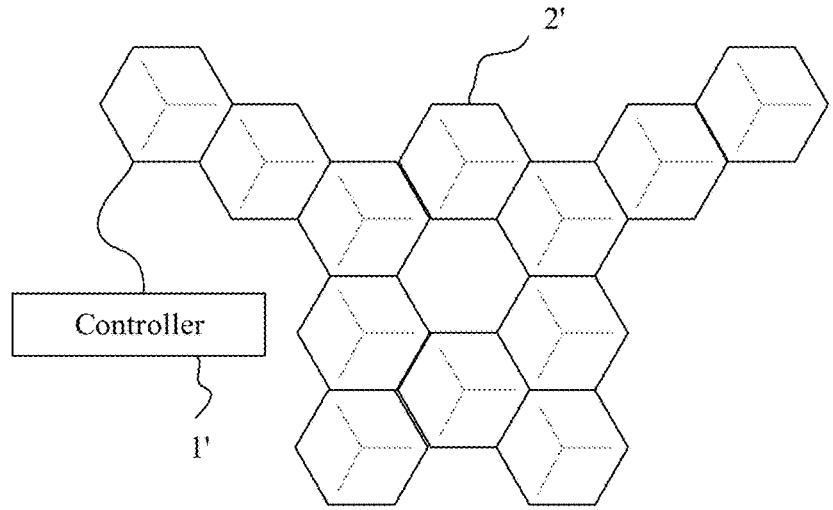
FIG. 3 illustrates a schematic diagram of an electrical structure of a splicing lamp according to an embodiment of the present disclosure.

In another example, FIG. 3 shows an ambient lamp in the product form of an splicing lamp. As shown in FIG. 3, the lighting component of the splicing lamp is composed of multiple adjacent lamp blocks. The splicing lamp is formed by splicing multiple lamp blocks adjacently to form a surface array. The entire surface array is electrically connected to the controller of the splicing lamp. The controller centrally controls the entire surface array 2' to play the lighting effect. Therefore, the controller 1' is responsible for the power control of each lamp block in the entire surface array, the command control of each lamp block, and the data transmission of each lamp block. The product form of lamp blocks can be various. According to the shape of the lamp blocks and the characteristics of their splicing relationship, a variety of different forms of lamp blocks can be used to splice the same splicing lamp. For example, the forms may include any polygonal shapes, such as triangles, quadrilaterals, pentagons, hexagons, etc., or any radial shapes composed of multiple lines, etc. These shapes are suitable for being spliced in adjacent on the same plane to form a certain layout pattern.

Each lamp block of the splicing lamp can be used as an independent lighting component, in which a control chip that communicates with the controller is provided as described above. In addition, each lamp block includes multiple light-emitting units, and each light-emitting unit can also be provided with a corresponding control chip to parse the playback encoded data obtained according to the lighting-effect playback instruction to generate a corresponding light control signal, and the light-emitting element in the corresponding light-emitting unit is controlled by the light control signal to emit light according to specific lighting parameters. The control chip of the lamp block is responsible for communicating with the controller, and can transmit the corresponding playback encoded data to the control chip of each light-emitting unit to achieve centralized control, so as to form a centralized control unit.

According to the above product architecture of the ambient lamp, it is not difficult to understand that the ambient lamp instruction transmission method of the present disclosure mainly plays the role of encoding and generating the lighting-effect playback instruction, so it is mainly implemented in the control chip of the controller of the ambient lamp, and the ambient-lamp instruction application method of the present disclosure mainly plays the role of decoding and applying the lighting-effect playback instruction, so it is mainly implemented in the control chip of the lighting component of the ambient lamp. In order to achieve these purposes, the various methods of the present disclosure can be implemented as corresponding computer program products, stored in the memory of the corresponding control chip of the ambient lamp, and called and run by the central processing unit in the control chip from the memory, thereby executing the various steps of the corresponding methods.

It should be understood that the ambient lamp instruction transmission method and the ambient-lamp instruction application method of the present disclosure correspond to each other in technical means. Therefore, when viewed from the ambient lamp as a whole, the two methods can cover and use each other's various technical means and various embodiments. Further, the two methods can also be combined to form a higher-level ambient lamp instruction control method.

Figure 4:
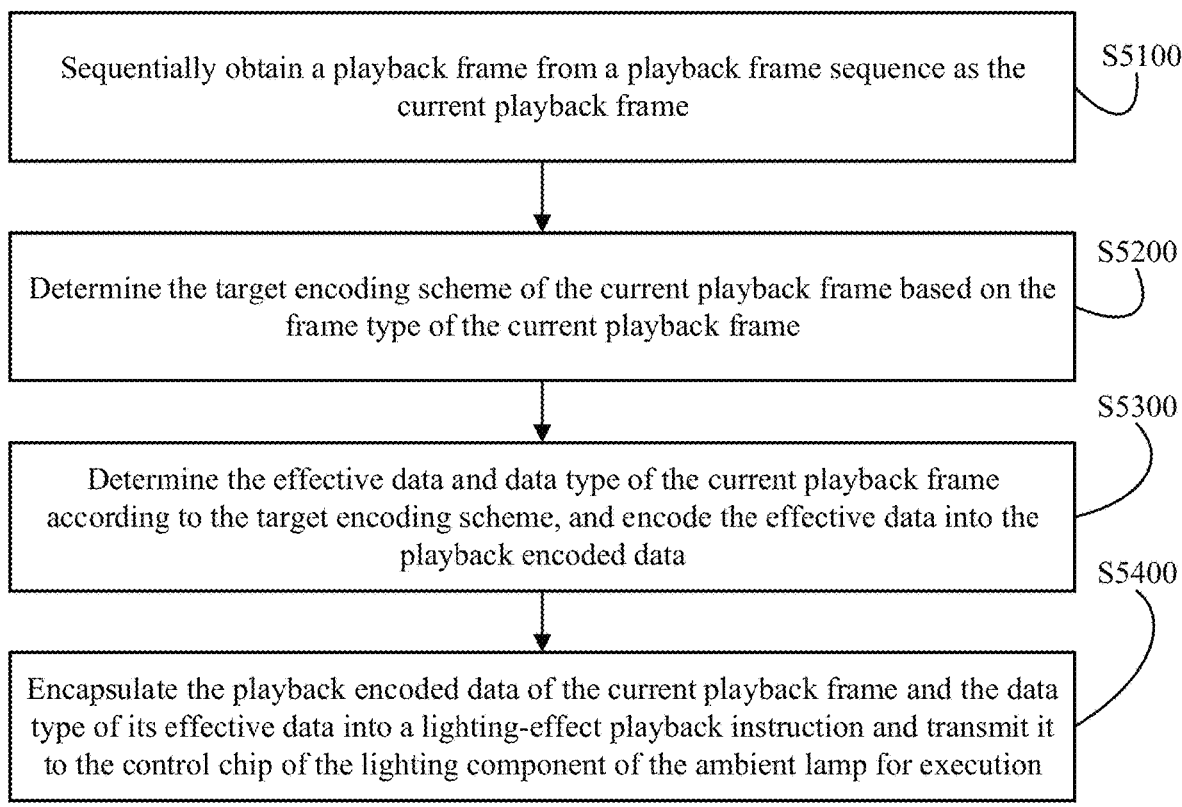
FIG. 4 illustrates a flow diagram of an ambient lamp instruction transmission method according to an embodiment of the present disclosure.

Referring to FIG. 4, in one embodiment, an ambient lamp instruction transmission method of the present disclosure may be mainly implemented on the controller side of the ambient lamp, and may be executed by the control chip of the controller. The method may include the following.

Step S5100, sequentially obtain a playback frame from a playback frame sequence as the current playback frame.

The lighting effect played by the ambient lamp is realized by multiple data frames played in a time sequence, and each data frame can be regarded as a playback frame. In the playback frame, each light-emitting unit in the surface array formed by the lighting component in the ambient lamp is given control data for controlling the light-emitting operation of each light-emitting unit. Therefore, each playback frame can regard each light-emitting unit in the surface array as a pixel, and the entire playback frame can be regarded as image data.

The surface array of the ambient lamp can be described with the help of its light-emitting unit layout information. The controller can obtain the light-emitting unit layout information of the surface array of the lighting component by querying the lighting component in advance, or receiving the file transmitted by the user through the terminal device, and can store it in the memory for recall at any time. Accordingly, when the controller obtains an original image as an original image frame, the controller can convert the original image frame into a corresponding playback frame according to the light-emitting unit layout information, so as to project the light effect of the original image frame onto the corresponding playback frame. When the controller needs to play the lighting effect according to an animation image, the controller can convert each original image frame in the animation image into a corresponding playback frame one-by-one according to the light-emitting unit layout information, and these playback frames are organized into a playback frame sequence in a time sequence, so as to control the lighting component to play the lighting effect of the corresponding frames on the surface array based on the playback frame sequence.

The light-emitting unit layout information can be described in different forms according to different forms of ambient lamp.

For example, for the curtain lamp, its lighting component is composed of multiple light strips arranged in the same direction, and each light strip has the same number of multiple lamp beads as light-emitting units, which form a matrix array as a whole. Therefore, the light-emitting unit layout information can express the position information of each light-emitting unit according to this matrix relationship, so as to describe the spatial distribution results of each light-emitting unit in the surface array.

For another example, for the splicing lamp, its lighting component is composed of multiple adjacent lamp blocks, each lamp block is divided into regions, and each region contains multiple light-emitting units. In this case, although the surface array organized by each lamp block is not an intuitive matrix structure, it can still describe the spatial distribution results of each light-emitting unit in the surface array by indicating the position information of each lamp block and each light-emitting unit.

The playback frame sequence of the present disclosure plays the corresponding lighting effect in time sequence through all the playback frames therein, and through the coordinated action of the lighting effects of each playback frame, the corresponding dynamic effect can be presented on the surface array of the lighting component. Therefore, the playback frame sequence can usually come from the same lighting effect animation file, and each playback frame therein can be set for each original image frame in the lighting effect animation file.

Since each playback frame in the playback frame sequence is organized according to the timing, in the process of obtaining the playback frame in the playback frame sequence to control the surface array of the lighting component to form the corresponding frame lighting effect, the playback frame sequence can be regarded as a message queue. Starting from the first playback frame, each playback frame is dequeued one-by-one through the message queue. For each dequeued playback frame, it is regarded as the current playback frame, and the subsequent steps are executed, such as step S5200 to step S5400, until the lighting effect play instruction corresponding to the current playback frame is issued, thereby completing the lighting effect playback of each playback frame.

Step S5200, determine the target encoding scheme of the current playback frame based on the frame type of the current playback frame.

For the image frame of the animated image, the attributes of different image frames can usually be distinguished according to the frame type. Since the playback frame is also equivalent to an image frame, the playback frame in the playback frame sequence of the present disclosure can also be distinguished into different frame types according to its frame attributes.

For the ambient lamp of the present disclosure, certain applicable preset frame types may include the key frame, prediction frame, and special frame, etc. The key frame is equivalent to the 'I' frame in the conventional image encoding protocol, indicating that the current playback frame includes independent and complete data. For the key frame, its full original data needs to be encoded as the effective data to provide complete image information. Generally speaking, a key frame can be set for every second. For example, when the frame rate is 30 frames per second, a key frame can be set every 30 frames. The prediction frame is equivalent to the 'P' frame in the conventional image encoding protocol, indicating that the current playback frame is data that can be obtained by adapting the motion vector data transformation of its previous adjacent playback frame. Therefore, the original data of the current playback frame can usually be determined based on the motion vector data and its previous adjacent playback frame, and the motion vector data can be used as the effective data required for its encoding. The special frame includes any other types of image frames except key frames and prediction frames. For such image frames, their original data can be determined by using the frame difference data between the frame and the previous adjacent playback frame, or the original data can be used directly. The specific data used as the effective data for encoding to obtain its playback encoded data can be determined by trial calculation or other appropriate means.

It should be pointed out that the original data here may refer to the data form of the original complete representation in the playback frame, that is, the bitmap form of the control data corresponding to each light-emitting unit. The adjacent image frame referred to in the present disclosure can refer to the previous playback frame that arrives earlier than the current playback frame in the playback frame sequence in terms of timing, or the previous several playback frames, or the key frame before the current playback frame, which can be set flexibly. In some embodiments, when there is no adjacent playback frame for the current playback frame, the current playback frame can also be directly regarded as a key frame.

The controller can determine whether the current playback frame belongs to different frame types such as key frames, predicted frames, special frames, etc., based on various algorithms according to the image data relationship between the current playback frame and its previous adjacent playback frame. When the computing power of the controller's control chip is sufficient to deploy a lightweight deep learning model, the deep learning model can also be used to identify the frame type of each current playback frame with reference to its previous adjacent playback frame, so as to quickly and accurately determine the frame type of the current playback frame with the help of the intelligence of the neural network.

It is not difficult to understand that different frame types may have different effective data to be encoded, and the data volume may also be different. In this case, the corresponding encoding scheme can be set for different frame types. Therefore, based on the frame type of the current playback frame, the encoding scheme corresponding to the frame type can be determined as the target encoding scheme, and then the effective data of the current playback frame can be encoded according to the target encoding scheme to obtain the corresponding playback encoded data.

In the case where the corresponding frame type is a key frame, the present disclosure provides an original-image encoding scheme for it, and sets the original-image encoding scheme to encode the original data of the current playback frame as the effective data to obtain the corresponding playback encoded data. In the case where the corresponding frame type is a motion frame, the present disclosure provides a vector encoding scheme for it, and sets the vector encoding scheme to encode the motion vectors of the current playback frame relative to its previous adjacent playback frame as the effective data to obtain the corresponding playback encoded data. In the case where the corresponding frame type is a special frame, the present disclosure provides a trial calculation encoding scheme for it, and sets the trial calculation encoding scheme to select the one with the smaller data volume from the two playback encoded data obtained by trial calculation as the playback encoded data of the current playback frame, where the two playback encoded data are respectively obtained by encoding the original data of the current playback frame, and the frame difference data between the current playback frame and its previous adjacent playback frame as the effective data of the trial calculation.

Accordingly, it can be known that the target encoding scheme corresponding to the frame type may be pre-set, and can be implemented as a corresponding encoding interface. After the corresponding encoding algorithm is determined according to the frame type, the encoding interface can be called accordingly.

Step S5300, determine the effective data and data type of the current playback frame according to the target encoding scheme, and encode the effective data into the playback encoded data.

As described in the previous step, each encoding scheme has previously specified how to determine the effective data corresponding to the current playback frame. Thus, when the encoding interface corresponding to a target encoding scheme is called, the encoding interface determines the effective data corresponding to the current playback frame based on the current playback frame and its previous adjacent playback frame according to its preset business logic. The following distinguishes various frame types and explains the effective data (or valid data) determined by the current playback frame accordingly.

For key frames, since it needs to encode their complete original data, when the corresponding original-image encoding scheme is applied, its original data is used as effective data, and the preset encoding algorithm is directly called to encode the effective data to obtain the corresponding playback encoded data. Since the encoding of the original data involves a large amount of data, when selecting the encoding algorithm, the Fastlz (LZ77) encoding algorithm, Huffman encoding algorithm, and other lossless or lossy compression encoding algorithms can be selected, so as to keep the data volume of the playback encoded data obtained by encoding the current playback frame within a reasonable volume range as much as possible, so as to achieve the effectively controlling the transmission efficiency of the controller, for example, to minimize the playback encoded data as much as possible.

For the prediction frame, since it can determine the motion vector data based on the motion relationship between the current playback frame and the previous adjacent image frame, the motion vector data is expressed in the form of position coordinates, and the data volume is small, so the vector encoding scheme corresponding to the prediction frame can use the motion vector data as effective data and directly encode it to obtain the playback encoded data corresponding to the current playback frame, thereby ensuring a small amount of data and bandwidth. Of course, in other embodiments, the vector encoding scheme can still further call another encoding algorithm to compress the motion vector data to further reduce the data volume of the corresponding playback encoded data.

For special frames, since they are neither key frames nor prediction frames, and can be ambiguous, the trial calculation encoding scheme is applied as the target encoding scheme. When the trial calculation encoding scheme is applied, its corresponding business logic is run. Accordingly, the corresponding encoding interface can first reuse the encoding algorithm corresponding to the key frame as the first encoding algorithm in the way of processing the key frame, and encode the original data of the current playback frame as the trial calculation effective data to obtain the first playback encoded data. Then, the frame difference data between the current playback frame and its previous adjacent playback frame is calculated, and then the encoding algorithm corresponding to the prediction frame is called as the second encoding algorithm, and the frame difference data of the current image frame as the trial calculation effective data is encoded to obtain the second playback encoded data. Finally, the data volume of the first playback encoded data and the second playback encoded data are compared, and it determines the one with the smallest data volume as the playback encoded data corresponding to the current playback frame. Similarly, it can obtain the trial calculation effective data corresponding to this playback encoded data, that is, the real effective data of the current playback frame. Also, the first encoding algorithm and the second encoding algorithm used here can both be compression encoding algorithms, which can be flexibly set.

Accordingly, when a target encoding scheme is applied, the data source corresponding to the playback encoded data of the current playback frame is determined, that is, the effective data. Further, the type of the effective data is determined, so the data type of the effective data is determined, and each playback encoded data is associated with the data type adopted by its effective data, which can be used for the subsequent encapsulation of the lighting-effect playback instruction, and the data type can further guide how to restore the original data of the current playback frame according to the decoded effective data after decoding the playback encoded data. The data type of the effective data is set according to the type of the effective data. Specifically, for the three different situations where the effective data belongs to the original data, motion vector data, and frame difference data, the data type can be set to include the original data type, vector data type, and frame difference data type.

According to the description here, it can also be seen that the trial calculation encoding scheme plays a substantial role in the goal of minimizing the amount of playback encoded data. Moreover, in several encoding schemes, specific encoding algorithms can be reused as needed, which can effectively reduce the amount of code of the corresponding computer program and save product development costs. More importantly, according to the flexible selection of these encoding schemes, the bandwidth overhead of the transmission of each playback encoded data required for the entire lighting effect between the controller and the lighting component can be effectively reduced, thereby improving the transmission capacity and ensuring that the lighting component can work at a higher refresh rate to play the corresponding lighting effect, making the lighting effect more delicate and natural.

Step S5400, encapsulate the playback encoded data of the current playback frame and the data type of its effective data into a lighting-effect playback instruction and transmit it to the control chip of the lighting component of the ambient lamp for execution.

After completing the encoding of a playback frame and obtaining its corresponding playback encoded data and the data type of its effective data, the controller can encode the playback encoded data and the data type into the same data packet as a lighting-effect playback instruction according to the data communication protocol established between the controller and the lighting component, and then send the data packet to the control chip of the lighting component to realize the transmission of the lighting-effect playback instruction corresponding to the current playback frame.

After receiving the data packet, the control chip of the lighting component regards the data packet as a lighting-effect playback instruction, parses and extracts the playback encoded data and data type therein, and then decodes the playback encoded data in a manner corresponding to the encoding to obtain the effective data of the current playback frame. Thus, the effective data of the playback encoded data obtained by the decoding, and the data type to of effective data is determined, and the control chip of the lighting component can restore the original data of the current playback frame based on the data type and the effective data. The method for the control chip of the lighting component to restore the original data of the current playback frame according to the lighting-effect playback instruction can be executed according to the ambient-lamp instruction application method of the present disclosure described later in the present disclosure.

Accordingly, the present disclosure sequentially obtains the playback frame used to control the lighting component to play the lighting effect of the corresponding frame as the current playback frame, analyzes the frame type of the current playback frame, distinguishes different frame types to determine the corresponding target encoding scheme, obtains the effective data corresponding to the current playback frame, encodes only the effective data to obtain the playback encoded data corresponding to the current playback frame, and encapsulates the playback encoded data together with the data type of its effective data as the lighting-effect playback instruction corresponding to the current playback frame, and transmits it to the control chip of the lighting component of the ambient lamp for corresponding decoding and application, so as to realize the control of the lighting component to play the lighting effect corresponding to the current playback frame. Thus, the current playback frame is flexibly encoded according to the corresponding target encoding scheme according to different frame types, ensuring that the optimal encoding scheme can be used for each frame type to realize the encoding of the current playback frame, which can optimize the encoding efficiency, and then effectively expand the scale of the playback frames passing through the data transmission channel, so that the embedded chip can transmit the lighting-effect playback instruction more efficiently, and transmit more frames of playback encoded data in a unit time. After the corresponding decoding, it can be quickly applied to realize the lighting-effect playback of the corresponding frame, effectively improving the refresh rate of the lighting component when playing the lighting effect, making the lighting effect more delicate and natural.

Based on the above embodiments of the instruction transmission method of the present disclosure, referring to FIG. 5, the process of determining the target encoding scheme of the current playback frame based on the frame type of the current playback frame may include the following.

Step S5210, identify and determine the frame type of the current playback frame. The frame type is any one of a key frame, a prediction frame, and a special frame, the key frame indicates that the current playback frame includes independent and complete data, the prediction frame indicates that the current playback frame includes data that can be transformed by the adaptive motion vector data of its previous adjacent playback frame, and the special frame indicates that the current playback frame includes other types of data that are not the key frame and the prediction frame.

As described above, in the present disclosure, the frame type of the current playback frame can belong to any one of the key frame, prediction frame, and special frame. Accordingly, when a playback frame in the playback frame sequence is dequeued as the current playback frame, the original data of the current playback frame and the original data of its previous adjacent image frame can be analyzed to determine whether the current playback frame belongs to a key frame, a prediction frame, or a special frame.

In one embodiment, the algorithm for identifying the frame type can be implemented using a traditional algorithm, and the traditional algorithm can be implemented as a corresponding identification interface. The identification interface is called to identify the current playback frame and its previous adjacent image frame, and the frame type of the current playback frame can be obtained. The traditional algorithm has the advantages of convenient and efficient calculation, and is more suitable for use in embedded chips.

In another embodiment, a frame type recognition model based on deep learning can be pre-trained, and the original data of the current playback frame and its previous adjacent image frame are respectively encoded and inputted into a feature extraction network of the frame type recognition model. The feature extraction network extracts their respective deep semantic information, and then the two deep semantic information are fused into a comprehensive feature map. Then, through the multiple classifiers in the frame type recognition model, it is mapped to a preset classification space, and the classification probability of the categories corresponding to the key frame, prediction frame, and special frame setting in the classification space is determined, and the frame type with the largest classification probability is determined as the frame type of the current playback frame. The feature extraction network can use any encoder using in one of a convolutional neural network (CNN), a recurrent neural network (RNN), and a transformer. The frame type recognition model can be pre-trained with corresponding training samples and supervisory labels, so as to learn the ability to identify the frame type of the first original data according to the given first and second original data, wherein the first original data is constrained to be the original data corresponding to the inputted current playback frame, and the second original data is constrained to be the original data corresponding to the inputted adjacent playback frame.

The model based on deep learning can quickly, efficiently and accurately determine the frame type, and is more intelligent. Therefore, it can be used preferentially when the computing power of the controller of the ambient lamp is competent.

Step S5220: If the frame type of the current playback frame is a key frame, the target encoding scheme of the current playback frame is determined to be the original-image encoding scheme, and the original-image encoding scheme is set to encode the original data of the current playback frame as effective data to obtain the corresponding playback encoded data.

Step S5230: If the frame type of the current playback frame is a prediction frame, the target encoding scheme of the current playback frame is determined to be the vector encoding scheme, and the vector encoding scheme is set to encode the motion vectors of the current playback frame relative to its previous adjacent playback frame as effective data to obtain the corresponding playback encoded data.

Step S5240: If the frame type of the current playback frame is a special frame, the target encoding scheme of the current playback frame is determined to be the trial calculation encoding scheme, and the trial calculation encoding scheme is set to select the one with the smallest data amount from the two playback encoded data obtained by trial calculation as the playback encoded data of the current playback frame, and the two playback encoded data are respectively encoded with the original data of the current playback frame and the frame difference data between the current playback frame and its previous adjacent playback frame as the trial calculation effective data.

According to the above three steps, the frame type of the current playback frame is distinguished as one of a key frame, a prediction frame, and a special frame, and the target encoding scheme of the current playback frame is set to one of the original-image encoding scheme, the vector encoding scheme, and the trial calculation encoding scheme respectively. The functions of various encoding schemes can be referred to those as described above, and they are applied and executed in subsequent steps. It should be pointed out that, in other embodiments based on this embodiment, special frames can be further subdivided. For example, blank frames can be identified from special frames. For blank frames, it is only necessary to transmit special identifiers as playback encoded data when constructing the lighting-effect playback instruction, and the corresponding understanding can be obtained on the control chip side of the lighting component. According to the above embodiments, it can be known that the frame type of the current playback frame can be quickly identified by adopting an appropriate identification method, so as to quickly determine the corresponding target encoding scheme according to the frame type. Various identification methods can be flexibly selected to adapt to the type of control chip used by the controller of the ambient lamp, which is more convenient to implement.

Based on the above embodiments of the instruction transmission method of the present disclosure, the process of determining the effective data and the data type of the current playback frame according to the target encoding scheme, and encoding the effective data into playback encoded data may include the following.

Step S5310, apply the target encoding scheme to the current playback frame, and encode the effective data of the current playback frame according to the target encoding scheme to generate the corresponding playback encoded data.

As mentioned above, after the corresponding target encoding scheme is determined for the current playback frame, the target encoding scheme can be applied to the current playback frame. The target encoding scheme guides how to determine the effective data of the current playback frame based on the original data of the current playback frame and the original data of its adjacent playback frames, and then the effective data can be used as the basis, and the corresponding encoding algorithm can be applied to encode the effective data into the playback encoded data corresponding to the current playback frame.

Step S5320, determine the corresponding data type according to the type of the effective data of the playback encoded data, and the data type includes the original data type, the vector data type, and the frame difference data type corresponding to the original data, the motion vector data, and the frame difference data, respectively.

In the process of applying the target encoding scheme to determine the effective data of the current playback frame, the data type of the effective data is also determined. Since the data types corresponding to different types of data have been configured in advance according to the data types of the effective data, once the effective data is determined, its corresponding data type is also determined.

Accordingly, when the effective data is original data, its data type is the original data type; when the effective data is motion vector data, its data type is the vector data type; and when the effective data is frame difference data, its data type is the frame difference data type. The indications of various data types are clear, which is convenient for identification during decoding and restoration.

It should be pointed out that, when the target encoding scheme is the trial calculation encoding scheme, the trial calculation effective data used to encode the playback encoded data may be the original data of the current playback frame or the frame difference data of the current playback frame relative to its adjacent playback frame. Specifically, when obtaining the respective playback encoded data according to the data, the one with the smallest data volume should be selected.

According to the above embodiments, in the process of applying the corresponding target encoding scheme for the current playback frame, the corresponding effective data and data type can be determined to form complete indication information, where the effective data can be encoded as the playback encoded data, and the playback encoded data and the data type are associated and packaged as a lighting-effect playback instruction. By sending the lighting-effect playback instruction to the lighting component, it can be ensured that the control chip of the lighting component can restore the original data of the current playback frame according to the indication information, and ensure that the lighting effect of the corresponding frame can be played according to the original data.

Figure 6:
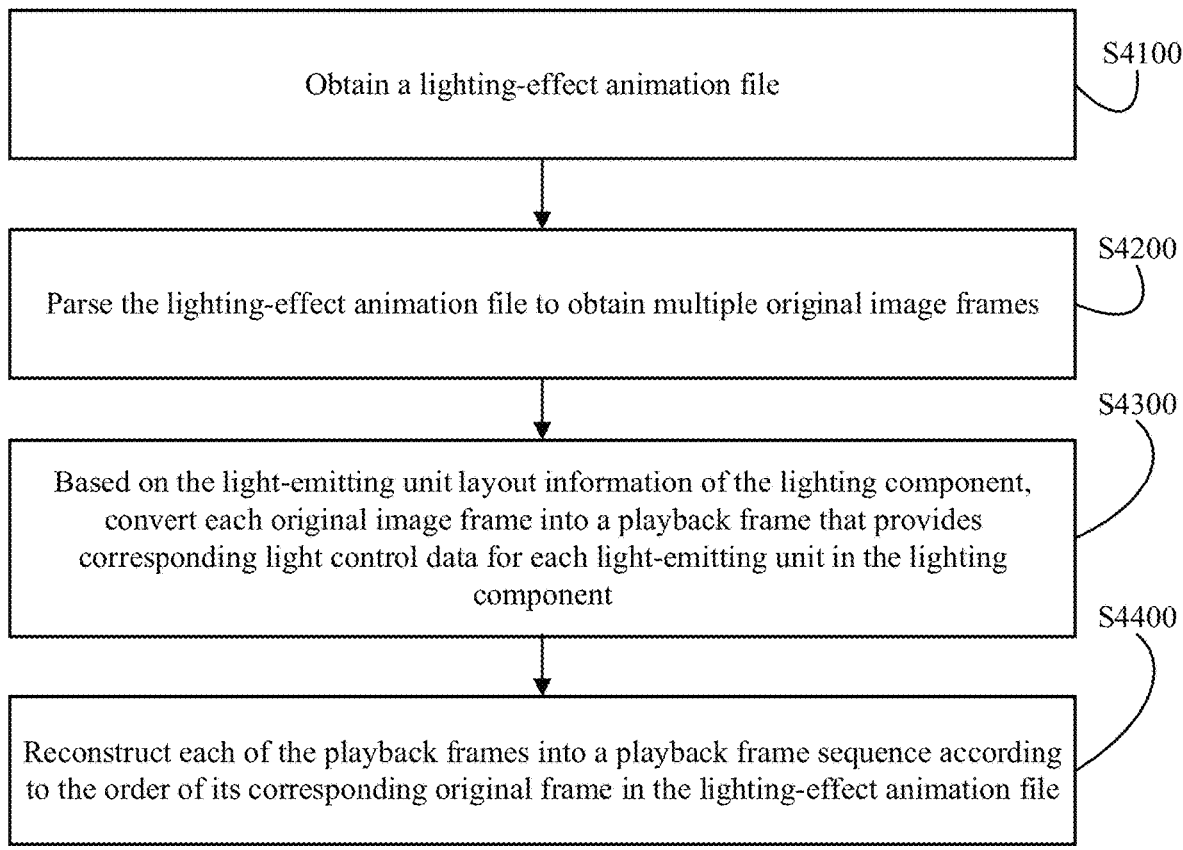
FIG. 6 illustrates a flow diagram of constructing a playback frame sequence based on the lighting effect animation file according to an embodiment of the present disclosure.

Based on the above embodiments of the instruction transmission method of the present disclosure, referring to FIG. 6, before the playback frame is obtained in sequence from the playback frame sequence as the current playback frame, the method may include the following.

Step S4100, obtain a lighting-effect animation file.

The lighting-effect animation file can be a file of any format suitable for defining animation images, such as Gif, Flash, PNG, etc., which usually contains multiple image frames organized in time sequence. The lighting-effect animation file can be pre-stored in the memory of the control chip of the controller, or it can be transmitted to the controller by the user through the terminal device. In short, the controller can obtain the lighting-effect animation file for use.

Step S4200, parse the lighting-effect animation file to obtain multiple original image frames.

After the controller obtains the lighting-effect animation file, the controller parses the file according to the format protocol of the lighting-effect animation file to extract the image frames contained therein, which are the original image frames.

Step S4300, based on the light-emitting unit layout information of the lighting component, convert each original image frame into a playback frame that provides corresponding light control data for each light-emitting unit in the lighting component.

As described above, the controller may obtain the light-emitting unit layout information of the lighting component in advance, and the light-emitting unit layout information stores the position information of each light-emitting unit in the surface array of the lighting component, so that the light-emitting unit can be regarded as a pixel in the surface array. Accordingly, for the original image frame extracted from the lighting-effect animation file, the color value of each pixel of the original image frame can be mapped to each corresponding pixel of the surface array of the lighting component, that is, each light-emitting unit, according to the light-emitting unit layout information, so that each light-emitting unit obtains the light control data corresponding to projected the light effect of the corresponding part of the original image frame, and the light control data is encapsulated as a whole, that is, to form a playback frame corresponding to the original image frame.

In one embodiment, also referring to FIG. 2, considering that the pixel density, i.e., the resolution, in the surface array formed by the lighting component is usually different from the resolution of the original image frame, the conversion ratio between the pixel density of the original image frame and the pixel density of the surface array can be determined in advance. Then, the multiple pixels in the original image frame that a single light-emitting unit, i.e., a single pixel, should be responsible for projecting can be determined based on this conversion ratio. That is to say, a mapping relationship can be established between multiple pixels in the original image frame that are adjacent to each other and a single light-emitting unit in the surface array of the lighting component. Accordingly, when determining the light control data of the light-emitting unit, the color values of the corresponding multiple pixels in the original image frame can be averaged and used as the light control data, thereby realizing the projection of the color tones of these pixels into the light-emitting unit. According to this relationship, the lighting effect of the original image frame is transferred to the corresponding playback frame, and the lighting effect played by the lighting component according to the playback frame naturally simulates the effect of the light atmosphere or even the image content of the original frame.

Step S4400, reconstruct each of the playback frames into a playback frame sequence according to the order of its corresponding original frame in the lighting-effect animation file.

After each original image frame is converted into its corresponding playback frame according to the previous step, each playback frame can be constructed into a playback frame sequence, and then the order of each playback frame in the playback frame sequence can be reorganized according to the established timing of each original image frame in the lighting-effect animation file, so that the order is consistent with the order of its corresponding original image frame in the lighting-effect animation file.

According to the above embodiments, the present disclosure can further construct the playback frame according to the lighting-effect animation file, and through the application of the playback frame, the ambient lamp can realize the simulation of the light atmosphere of the animation created by the lighting-effect animation file and the image content of the animation itself. Since the original image frames in the animation are actually image data, the data volume is large. In one embodiment, the controller converts the original image frame into the playback frame according to the layout information of the light-emitting units and then transmits it to the control chip of the lighting component for decoding and application, which has a smaller data volume. At the same time, it can consider both the lighting effect transmission and playback efficiency and the image quality of the atmosphere or pattern simulated by the lighting effect, effectively balancing various product requirements and making the ambient lamp more practical.

Based on the above embodiments of the instruction transmission method of the present disclosure, in one embodiment, the controller of the ambient lamp can play the same lighting effect in a loop. In this case, after step S5400 of encapsulating the data type of the playback encoded data and its effective data of the current playback frame into a lighting-effect playback instruction and transmits it to the control chip of the lighting component of the ambient lamp for execution, the method may return to the step of sequentially obtaining the playback frame from the playback frame sequence as the current playback frame, that is, step S5100, and continues to obtain the next playback frame to continue to iterate and execute the subsequent steps such as step S5200 to step S5400, and so on, until the last playback frame in the playback frame sequence completes the same iteration, and all the playback frames in the entire playback frame sequence have been completed. At this time, the process may continue to loop and iterate the various steps S5100 to step S5400 of the present disclosure from the first playback frame in the playback frame sequence, and so on. By continuously looping and playing the various playback frames in the entire playback frame sequence, the same dynamic lighting effect can be looped on the surface array of the lighting component.

In another embodiment based on the previous embodiments, before determining the target encoding scheme of the current playback frame based on the frame type of the current playback frame, the method may include the following.

Step S152, detecting whether there is a historically archived lighting-effect playback instruction mapped to the current playback frame and, if there is, directly transmitting the lighting-effect playback instruction to the control chip of the lighting component of the ambient lamp for execution, and then returning to the step of sequentially obtaining a playback frame from the playback frame sequence as the current playback frame to continue obtaining a playback frame as the current playback frame. If there is not such instruction, continuing to execute the step of determining the target encoding scheme of the current playback frame based on the frame type of the current playback frame.

Specifically, after each playback frame is first constructed as a lighting-effect playback instruction in embodiments of the present disclosure, the corresponding lighting-effect playback instruction can be mapped and stored with the playback frame. Accordingly, when the playback frames in the playback frame sequence are iterated for the second time or more, each time a playback frame is called out from the playback frame sequence as the current playback frame, it needs to send the corresponding lighting-effect playback instruction to the lighting component for the playback frame. Therefore, it can first detect whether there is a previously mapped lighting-effect playback instruction in the history archive for the current playback frame. If so, the lighting-effect playback instruction in the history archive is called and retransmitted to the control chip of the lighting component for execution. Then, the next playback frame can be called out as the current playback frame in step S5100, and the steps can be performed similarly. If there is no lighting-effect playback instruction in the history archive, the processing of the current playback frame can be continued according to the original business logic, for example, the process of step S5200 to step S5400 is continued to be executed to construct a new lighting-effect playback instruction for the current playback frame.

It can be seen that when the same lighting effect is played in a loop, the lighting-effect playback instruction generated for the first time can be reused to avoid the controller from having to re-construct the lighting-effect playback instruction for the playback frame each time, which can effectively reduce the load of the controller's control chip and system overhead.

Figure 7:
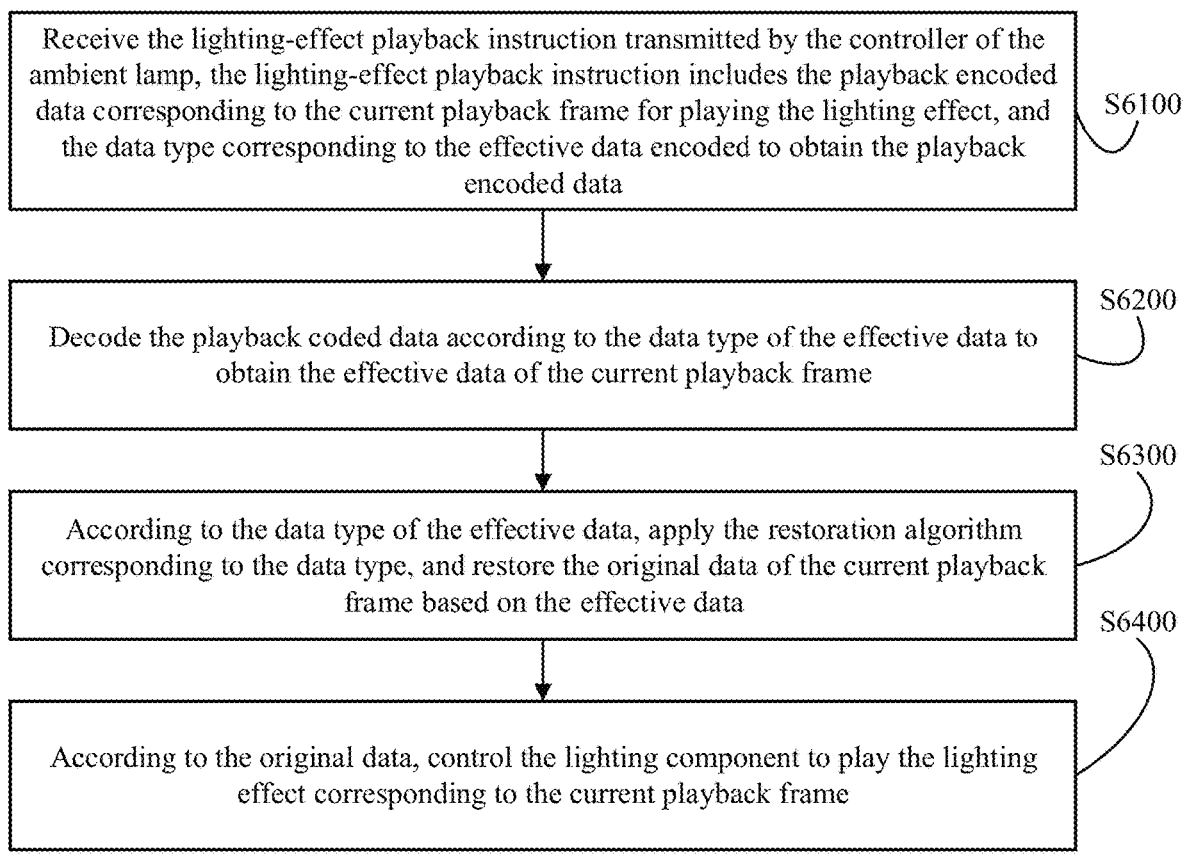
FIG. 7 illustrates a flow diagram of an ambient-lamp instruction application method according to an embodiment of the present disclosure.

Referring to FIG. 7, in one embodiment, the ambient-lamp instruction application method of the present disclosure is mainly implemented on the lighting component side of the ambient lamp, and the control chip of the lighting component is responsible for execution of the method. As shown in FIG. 7, the ambient-lamp instruction application method may include the following.

Step S6100, receive the lighting-effect playback instruction transmitted by the controller of the ambient lamp, the lighting-effect playback instruction includes the playback encoded data corresponding to the current playback frame for playing the lighting effect, and the data type corresponding to the effective data encoded to obtain the playback encoded data.

The lighting-effect playback instruction received by the lighting component, as described above, is transmitted by the control chip of the controller in the ambient lamp where it is located. The lighting-effect playback instruction is transmitted in a data packet, encapsulating the playback encoded data corresponding to the current playback frame of the lighting effect, and the data type corresponding to the effective data encoded to obtain the playback encoded data.

The control chip of the controller of the present disclosure and the control chip of the lighting component can communicate based on any serial communication protocol, such as I2C (Inter-Integrated Circuit), SPI (Serial Peripheral Interface), UART (Universal Asynchronous Receiver/Transmitter), etc. As long as the two communicating parties recognize the protocol, they can receive each other's data packets, parse each other's data packets, and obtain the data and instructions therein.

Step S6200, decode the playback coded data according to the data type of the effective data to obtain the effective data of the current playback frame.

The control chip of the lighting component parses and extracts the lighting-effect playback instruction, and after obtaining the playback coded data and data type therein, the playback coded data can be further decoded in accordance with the pre-set protocol between the two parties to obtain the corresponding effective data.

Since the data type specifies the type of data used to encode the playback coded data, it actually specifies the encoding algorithm for encoding the corresponding effective data. Therefore, the control chip of the lighting component can determine the corresponding decoding algorithm according to the data type, and decode the playback coded data to obtain the corresponding effective data. For example, when the data type indicates an original data type, a specific encoding algorithm corresponding to the encoded original data is used. This specific encoding algorithm is a encoding algorithm determined by the pre-agreement with the controller chip of the controller, and the effective data is decoded to obtain the original data; when the data type indicates a vector data type, a corresponding specific encoding algorithm is used to decode the effective data to obtain motion vector data. Similarly, this specific encoding algorithm is consistent with the pre-agreement with the controller chip of the controller; when the data type indicates a frame difference data type, a encoding algorithm corresponding to the encoded frame difference data is used to decode the effective data to obtain the corresponding frame difference data as the effective data. Among them, the specific encoding algorithm used in decoding corresponds to the specific encoding algorithm used in encoding. If a compression algorithm is used in encoding, the compression algorithm is also used in decoding; if the first or second encoding algorithm is used in encoding, the first or second encoding algorithm is also used in decoding, and so on.

Step S6300, according to the data type of the effective data, apply the restoration algorithm corresponding to the data type, and restore the original data of the current playback frame based on the effective data.

Figure 8:
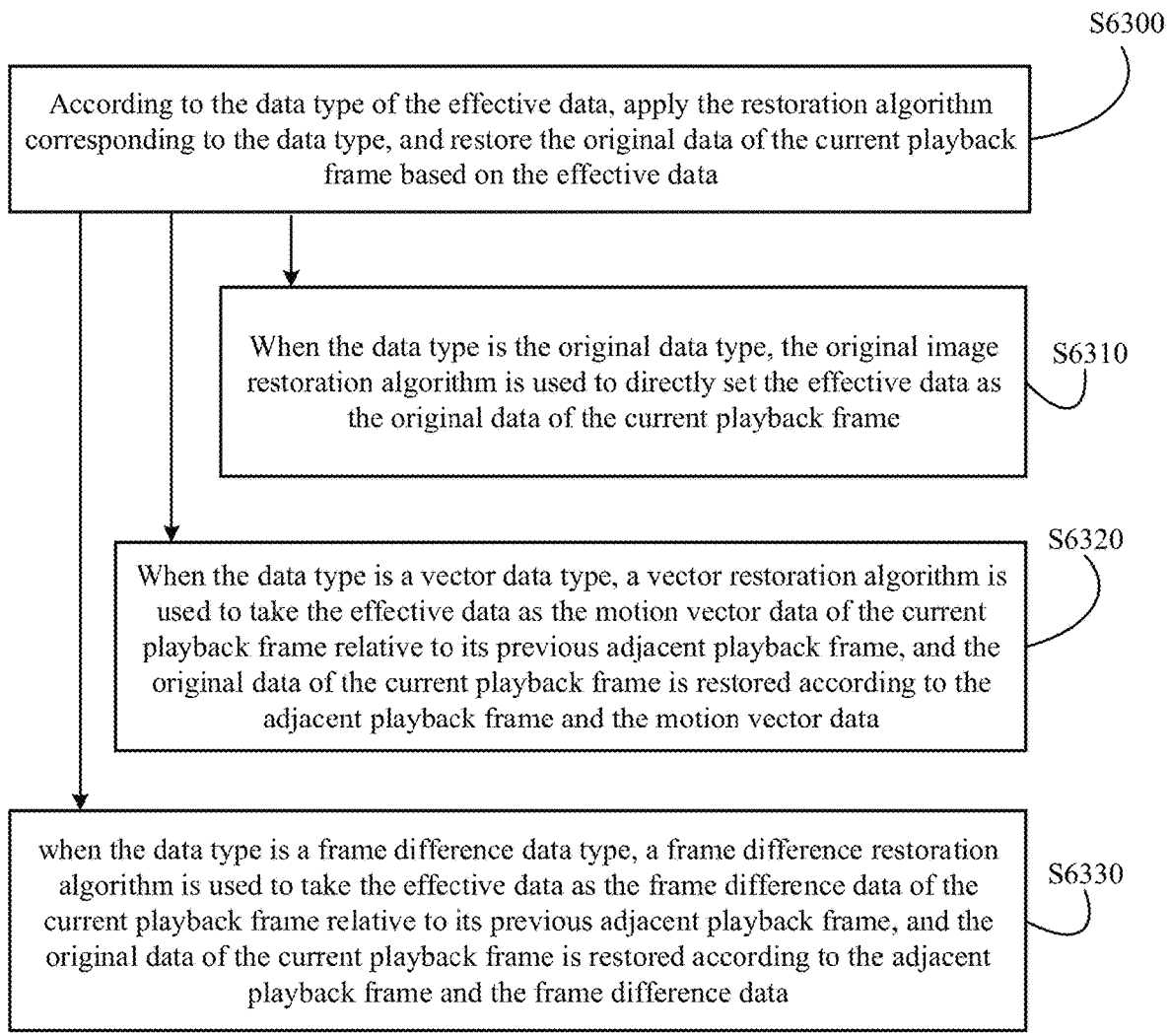
FIG. 8 illustrates a flow diagram of restoring the original data of the current playback frame based on the data type according to an embodiment of the present disclosure.

Although the corresponding effective data has been decoded and obtained in the previous step, it can be known that the effective data of different data types have different ways of restoring the original data of the current playback frame. Therefore, it needs to apply the preset restoration algorithm corresponding to the data type according to the data type to restore the effective data to the original data of the current playback frame. Specifically, as shown in FIG. 8, the processing process may include the following.

Step S6310, when the data type is the original data type, the original image restoration algorithm is used to directly set the effective data as the original data of the current playback frame.

When the data type is the original data type, it means that the effective data decoded from the playback encoded data is the original data itself. In this case, no additional processing is required, and the preset original image restoration algorithm is applied to directly set the effective data as the original data of the current playback frame. It should be noted that the case where the effective data is directly used as the original data may be a key frame or a special frame.

Step S6320, when the data type is a vector data type, a vector restoration algorithm is used to take the effective data as the motion vector data of the current playback frame relative to its previous adjacent playback frame, and the original data of the current playback frame is restored according to the adjacent playback frame and the motion vector data.

When the data type is a vector data type, it means that the effective data decoded from the playback encoded data is the motion vector data of the current playback frame relative to its adjacent playback frame, and its adjacent playback frame has been processed in advance to obtain its original data due to its timing sequence, so the preset vector restoration algorithm is applied to calculate according to the original data of the adjacent playback frame and the motion vector data to obtain the original data of the current playback frame.

Step S6330, when the data type is a frame difference data type, a frame difference restoration algorithm is used to take the effective data as the frame difference data of the current playback frame relative to its previous adjacent playback frame, and the original data of the current playback frame is restored according to the adjacent playback frame and the frame difference data.

When the data type is a frame difference data type, it means that the effective data decoded from the playback coded data is the frame difference data of the current playback frame relative to its adjacent playback frame. Since the adjacent playback frame is in advance in time sequence, its original data has been generated in advance. Therefore, the preset frame difference restoration algorithm is applied. On the basis of the original data of the adjacent playback frame, the effective data is superimposed and calculated in pixel correspondence, so that the original data of the current playback frame can be restored.

Step S6400, according to the original data, control the lighting component to play the lighting effect corresponding to the current playback frame.

The original data decoded and restored according to the above process is actually the original data of the current playback frame, which contains the light control data of each light-emitting unit in each lighting component, such as the color value. Therefore, the control chip of the lighting component can send the original data to each light-emitting unit, so that each light-emitting unit can control the light element inside the light-emitting unit to emit light according to the light control data corresponding to itself in the original data, thereby realizing the use of the original data to control the surface array of the lighting component to play a frame of image data, forming a frame image effect, and playing the role of decorating the atmosphere.

According to the above embodiments, it can be seen that the lighting component of the ambient lamp encodes the playback frame according to the corresponding scheme of the present disclosure, and decodes the playback encoded data in the lighting-effect playback instruction transmitted by the controller to obtain effective data according to the data type, and then restores the effective data to the original data of the current playback frame according to the data type, and uses the original data as the playback control data to control each light-emitting unit to coordinately play a frame of lighting effect, and similarly plays each frame of lighting effect to form a dynamic lighting effect. With the help of the encoding schemes, the ability to compress the data volume can be achieved, and more frames of original data can be received within a limited time, so that the lighting effect can be played at a higher refresh rate, and a more delicate lighting effect can be created, which is conducive to the further promotion and application of the ambient lamp product.

Figure 9:
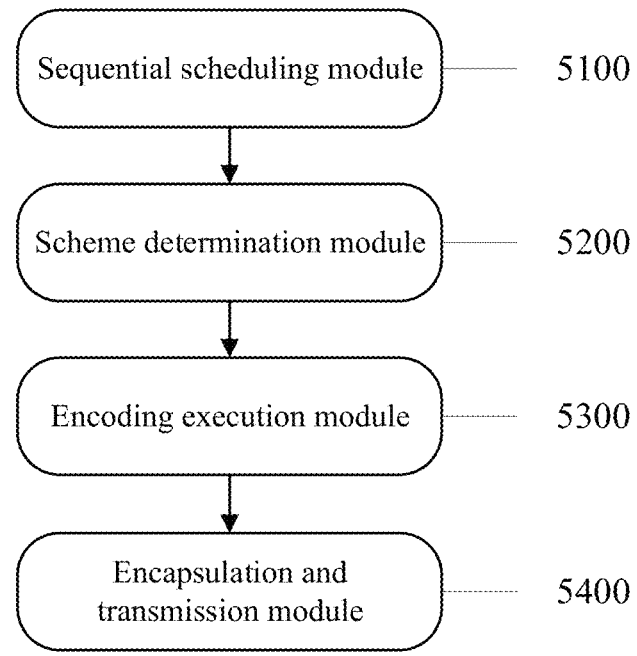
FIG. 9 illustrates a structural diagram of an ambient lamp instruction transmission device according to an embodiment of the present disclosure.

Referring to FIG. 9, another embodiment of the present disclosure also provides an ambient lamp instruction transmission device, which includes a sequential scheduling module 5100, a scheme determination module 5200, an encoding execution module 5300, and an encapsulation and transmission module 5400, etc. The sequential scheduling module 5100 is configured to sequentially obtain a playback frame from a playback frame sequence as a current playback frame. The scheme determination module 5200 is configured to determine a target encoding scheme for the current playback frame based on the frame type of the current playback frame. The encoding execution module 5300 is configured to determine the effective data and its data type of the current playback frame according to the target encoding scheme, and encode the effective data into playback encoded data. The encapsulation and transmission module 5400 is configured to encapsulate the playback encoded data of the current playback frame and the data type of its effective data into a lighting-effect playback instruction and transmit it to the control chip of the lighting component of the ambient lamp for execution.

Based on the above embodiments of the instruction transmission device of the present disclosure, the scheme determination module 5200 may include: a type identification unit, a first matching unit, a second matching unit, and a third matching unit, etc.

The type identification unit may be configured to identify and determine the frame type of the current playback frame, the frame type is any one of a key frame, a prediction frame, and a special frame, the key frame indicates that the current playback frame includes independent and complete data, the prediction frame indicates that the current playback frame includes data that can be transformed by adapting the motion vector data of its previous adjacent playback frame, and the special frame indicates that the current playback frame includes other types of data that are not the key frame and the prediction frame. The first matching unit may be configured to determine that, if the frame type of the current playback frame is a key frame, the target encoding scheme of the current playback frame is an original-image encoding scheme, and the original-image encoding scheme is set to encode the original data of the current playback frame as effective data to obtain the corresponding playback encoded data. The second matching unit may be configured to determine that, if the frame type of the current playback frame is a prediction frame, the target encoding scheme of the current playback frame is a vector encoding scheme, and the vector encoding scheme is set to encode the number of motion vectors of the current playback frame relative to its previous adjacent playback frame as effective data to obtain corresponding playback encoded data. The third matching unit may be configured to determine that, if the frame type of the current playback frame is a special frame, the target encoding scheme of the current playback frame is a trial calculation encoding scheme, and the trial calculation encoding scheme is set to select the one with the smallest data amount from the two playback encoded data obtained by trial calculation as the playback encoded data of the current playback frame, and the two playback encoded data are respectively encoded with the original data of the current playback frame and the frame difference data between the current playback frame and its previous adjacent playback frame as the effective data of trial calculation.

Based on the above embodiments of the instruction transmission device of the present disclosure, the encoding execution module 5300 may include: an application encoding unit and a type determination unit, etc. The application encoding unit may be configured to apply the target encoding scheme to the current playback frame, and determine the effective data of the current playback frame according to the target encoding scheme to encode and generate corresponding playback encoded data. The type determination unit may be configured to determine the corresponding data type according to the type of the effective data of the playback encoded data, and the data type includes an original data type, a vector data type, and a frame difference data type corresponding to the original data, the motion vector data, and the frame difference data, respectively.

Based on embodiments of the instruction transmission device of the present disclosure, the ambient lamp instruction transmission device of the present disclosure may also include an animation image acquisition module, configured to, before the operation of the sequential scheduling module 5100, acquire a lighting effect animation image file; a parsing and extraction module, configured to parse the lighting effect animation image file to obtain multiple original image frames therein; a data conversion module, configured to convert each original image frame into a playback frame corresponding to each light-emitting unit in the lighting component based on the layout information of the light-emitting units of the lighting component to provide corresponding lighting control data; a sequence construction module, configured to reconstruct each of the playback frames into a playback frame sequence according to the order of its corresponding original image frame in the lighting effect animation image file.

Based on the above embodiments of the instruction transmission device of the present disclosure, the instruction transmission device of the present disclosure further includes: an instruction reusing module, which is configured to, prior to the operation of the scheme determination module 5200, detect whether there is a historically archived lighting-effect playback instruction mapped to the current playback frame, and when it exists, directly transmit the lighting-effect playback instruction to the control chip of the lighting component of the ambient lamp for execution, and then return to the sequential scheduling module 5100 to continue to obtain a playback frame as the current playback frame; when it does not exist, continue to execute from the scheme determination module 5200.

Figure 10:
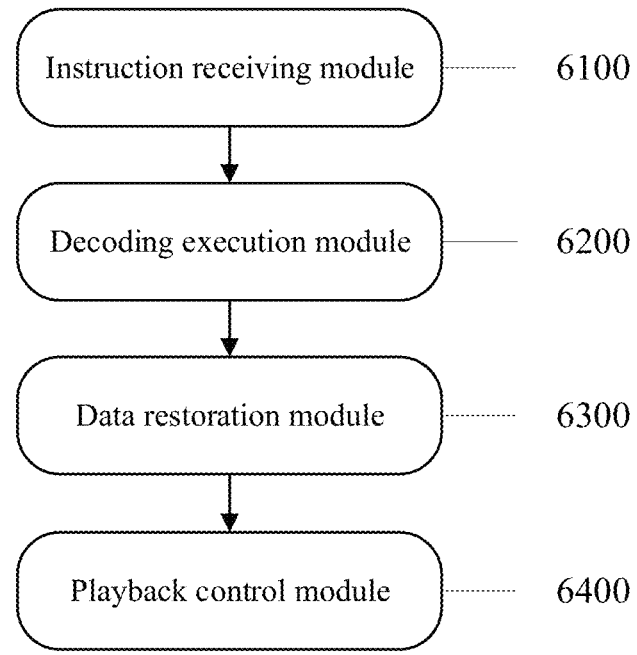
FIG. 10 illustrates a structural diagram of the ambient-lamp instruction application device according to an embodiment of the present disclosure.

Referring to FIG. 10, another embodiment of the present disclosure further provides an ambient-lamp instruction application device. As shown in FIG. 10, the ambient-lamp instruction application device may include: an instruction receiving module 6100, a decoding execution module 6200, a data restoration module 6300, and a playback control module 6400, etc. The instruction receiving module 6100 is configured to receive a lighting-effect playback instruction transmitted by a controller of the ambient lamp, and the lighting-effect playback instruction includes playback encoded data corresponding to the current playback frame for playing the lighting effect and a data type corresponding to the effective data having been encoded to obtain the playback encoded data. The decoding execution module 6200 is configured to decode the playback encoded data according to the data type of the effective data to obtain the effective data of the current playback frame. The data restoration module 6300 is configured to, according to the data type of the effective data, apply a restoration algorithm corresponding to the data type, and restore the original data of the current playback frame based on the effective data. The playback control module 6400 is configured to, according to the original data, control the lighting component to play the lighting effect corresponding to the current playback frame.

Based on embodiments of the instruction application device of the present disclosure, the data restoration module 6300 may include: an original image restoration unit, a vector restoration unit, and a frame difference restoration unit, etc. The original image restoration unit may be configured to use an original image restoration algorithm to directly set the effective data as the original data of the current playback frame, when the data type is an original data type. The vector restoration unit may be configured to use a vector restoration algorithm to use the effective data as the motion vector data of the current playback frame relative to its previous adjacent playback frame, when the data type is a vector data type, and restore the original data of the current playback frame according to the adjacent playback frame and the motion vector data. The frame difference restoration unit may be configured to use a frame difference restoration algorithm to use the effective data as the frame difference data of the current playback frame relative to its previous adjacent playback frame, when the data type is a frame difference data type, and restore the original data of the current playback frame according to the adjacent playback frame and the frame difference data.

Figure 11:
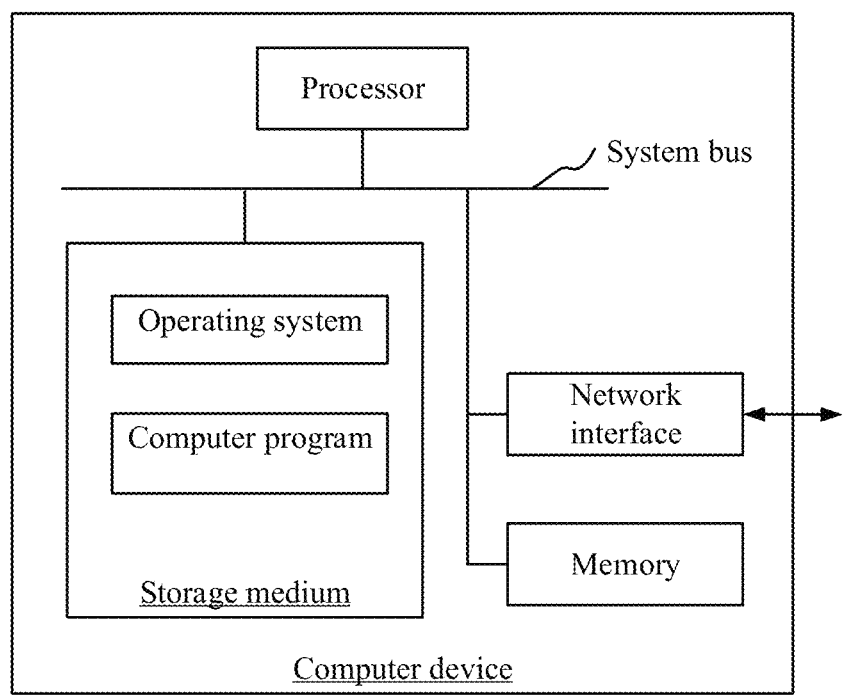
FIG. 11 illustrates a structural diagram of a computer device according to an embodiment of the present disclosure.

Based on the above embodiments of the present disclosure, referring to FIG. 11, another embodiment of the present disclosure also provides a computer device, which can be used as a controller/lighting component in an ambient lamp. As shown in FIG. 11, which is a schematic diagram of the internal structure of the computer device, the computer device includes at least one processor, a computer-readable storage medium, a memory, and a network interface connected via a system bus. Among them, the computer-readable storage medium of the computer device stores an operating system, a database and computer-readable instructions, and the database may store a control information sequence. When the computer-readable instructions are executed by the processor, the processor can implement an ambient lamp instruction transmission/application method. The processor of the computer device is used to provide computing and control capabilities to support the operation of the entire computer device. The memory of the computer device may store computer-readable instructions, and when the computer-readable instructions are executed by the processor, the processor can execute the ambient lamp instruction transmission/application method of the present disclosure. The network interface of the computer device is used to connect and communicate with the terminal device. It can be understood by those skilled in the art that the structure shown in FIG. 11 is only a block diagram of a partial structure related to the present disclosure, and does not constitute any limitation on the computer device to which the present disclosure may be applied. The specific computer device may include more or fewer components than shown in the figure, or may combine certain components, or have different component arrangements.

In one embodiment, the processor may be used to execute the specific functions of each module and its submodules in FIG. 9/FIG. 10, and the memory stores the program code and various types of data required to execute the above modules or submodules. The network interface is used for data transmission to and from user terminals or servers, or inside the ambient lamp. The memory in one embodiment stores the program code and data required to execute all modules/submodules in the ambient lamp instruction transmission device of the present disclosure, and the server can call the program code and data of the server to execute the functions of all submodules.

The present disclosure also provides a storage medium storing non-transitory computer-readable instructions. When the computer-readable instructions are executed by one or more processors, one or more processors may execute the steps of the ambient lamp instruction transmission/application method described in any embodiment of the present disclosure.

The present disclosure also provides a computer program product, including a computer program/instructions. When the computer program/instructions is executed by one or more processors, the steps of the ambient lamp instruction transmission/application method described in any embodiment of the present disclosure are implemented.

A person skilled in the art can understand that the implementation of all or part of the processes in the above-mentioned embodiment method of the present disclosure can be completed by instructing the relevant hardware through a computer program. The computer program can be stored in a computer-readable storage medium. When the computer program is executed, it can include the processes of the embodiments of the above-mentioned methods. Among them, the aforementioned storage medium can be a computer-readable storage medium such as a disk, an optical disk, a read-only memory (ROM), or a random access memory (RAM).

The above describes examples of implementation of the present disclosure. It should be pointed out that for those skilled in the art, without departing from the principle of the present disclosure, improvements and modifications can be made, and these improvements and modifications should also be regarded as within the scope of the present disclosure.

Accordingly, when playing the lighting effect, the controller side of the ambient lamp implements flexible encoding of the current playback frame using the corresponding target encoding scheme according to different frame types, ensuring that the optimal encoding scheme can be used for each frame type to achieve the encoding of the current playback frame, which can optimize the encoding efficiency, and then effectively expand the scale of the playback frames passing through the data transmission channel, so that the embedded chip can transmit the lighting-effect playback instruction with higher efficiency, transmit more frame playback encoded data in unit time, and perform fast decoding application on the lighting component side, which can effectively improve the refresh rate of the lighting component when playing the lighting effect, making the lighting effect more delicate and natural, and contributing to the industrial promotion of the ambient lamp.

What is claimed is:

1. An instruction transmission method for an ambient lamp, comprising:

sequentially obtaining a playback frame from a playback frame sequence as a current playback frame;

determining a target encoding scheme of the current playback frame based on a frame type of the current playback frame;

determining effective data and a data type of the effective data of the current playback frame according to the target encoding scheme, and encoding the effective data into playback encoded data; and encapsulating the playback encoded data of the current playback frame and the data type of the effective data into a lighting-effect playback instruction, and transmitting the lighting-effect playback instruction to a control chip of a lighting component of the ambient lamp for execution, wherein the determining a target encoding scheme of the current playback frame based on a frame type of the current playback frame further includes:

identifying and determining the frame type of the current playback frame, the frame type being one of a key frame, a prediction frame, and a special frame; the key frame indicating that the current playback frame includes independent and complete data; the prediction frame indicating that the current playback frame includes data that can be transformed by adapting motion vector data relative to a previous adjacent playback frame; and the special frame indicating that the current playback frame includes other types of data that are not the key frame or the prediction frame;

when the frame type of the current playback frame is the key frame, determining that the target encoding scheme of the current playback frame is an original-image encoding scheme, the original-image encoding scheme being configured to use original data of the current playback frame as effective data for encoding to obtain the playback encoded data;

when the frame type of the current playback frame is the prediction frame, determining that the target encoding scheme of the current playback frame is a vector encoding scheme, and the vector encoding scheme being configured to encode the motion vector data of the current playback frame relative to the previous adjacent playback frame as effective data to obtain the playback encoded data; and when the frame type of the current playback frame is the special frame, determining that the target encoding scheme of the current playback frame is a trial calculation encoding scheme, and the trial calculation encoding scheme being configured to select one of two playback encoded data obtained by trial calculation with a smaller data amount as the playback encoded data of the current playback frame, and the two playback encoded data being respectively encoded with the original data of the current playback frame and frame difference data between the current playback frame and the previous adjacent playback frame as effective data of trial calculation.

2. The instruction transmission method for an ambient lamp according to claim 1, wherein the determining effective data and a data type of the effective data of the current playback frame according to the target encoding scheme, and encoding the effective data into playback encoded data further includes:

applying the target encoding scheme to the current playback frame, and encoding the effective data of the current playback frame according to the target encoding scheme to generate the corresponding playback encoded data; and determining a corresponding data type according to a type of the effective data of the playback encoded data, and the data type including an original data type, a vector data type, and a frame difference data type corresponding to the original data, the motion vector data, and the frame difference data, respectively.

3. The instruction transmission method for an ambient lamp according to claim 1, wherein, before sequentially obtaining a playback frame from a playback frame sequence as a current playback frame, the method further includes:

obtaining a lighting-effect animation file;

parsing the lighting-effect animation file to obtain multiple original image frames;

based on layout information of light-emitting units of the lighting component, converting each original image frame into a playback frame corresponding to each light-emitting unit in the lighting component to provide corresponding light control data; and reconstructing the playback frames into a playback frame sequence according to an order of corresponding original image frames in the lighting-effect animation file.

4. The instruction transmission method for an ambient lamp according to claim 1, wherein, before determining the target encoding scheme of the current playback frame based on the frame type of the current playback frame, the method further includes:

detecting whether there is a historically archived lighting-effect playback instruction mapped to the current playback frame;

when it is detected that there is a historically archived lighting-effect playback instruction mapped to the current playback frame, transmitting the lighting-effect playback instruction to the control chip of the lighting component of the ambient lamp for execution, and continuing the method from the sequentially obtaining a playback frame from a playback frame sequence as a current playback frame; and when it is detected that there is no historically archived lighting-effect playback instruction mapped to the current playback frame, continuing the method from the determining the target encoding scheme of the current playback frame based on the frame type of the current playback frame.

5. A non-transitory computer-readable storage medium storing a computer program including computer-readable instructions for, when executed a computer, performing an instruction transmission method for an ambient lamp according to claim 1.

6. An instruction application method for an ambient lamp, comprising:

receiving a lighting-effect playback instruction transmitted by a controller of an ambient lamp, wherein the lighting-effect playback instruction includes playback encoded data corresponding to a current playback frame for playing a lighting effect and a data type corresponding to effective data having been encoded to obtain the playback encoded data;

decoding the playback encoded data according to the data type of the effective data to obtain effective data of the current playback frame;

according to the data type of the effective data, applying a restoration algorithm corresponding to the data type to restore original data of the current playback frame based on the effective data; and controlling the lighting component to play the lighting effect corresponding to the current playback frame according to the original data, wherein the applying a restoration algorithm corresponding to the data type to restore original data of the current playback frame based on the effective data further includes:

when the data type is an original data type, applying an original image restoration algorithm to directly set the effective data as the original data of the current playback frame;

when the data type is a vector data type, applying an vector restoration algorithm to use the effective data as motion vector data of the current playback frame relative to a previous adjacent playback frame, and restoring the original data of the current playback frame based on the previous adjacent playback frame and the motion vector data; and when the data type is a frame difference data type, applying a frame difference restoration algorithm to use the effective data as frame difference data of the current playback frame relative to the previous adjacent playback frame, and restoring the original data of the current playback frame based on the adjacent playback frame and the frame difference data.

7. An ambient lamp, comprising:

a central processing unit, and a memory, wherein the central processing unit is configured to execute a computer program stored in the memory to perform an instruction transmission method, and the method comprises:

sequentially obtaining a playback frame from a playback frame sequence as a current playback frame;

determining a target encoding scheme of the current playback frame based on a frame type of the current playback frame;

determining effective data and a data type of the effective data of the current playback frame according to the target encoding scheme, and encoding the effective data into playback encoded data; and encapsulating the playback encoded data of the current playback frame and the data type of the effective data into a lighting-effect playback instruction, and transmitting the lighting-effect playback instruction to a control chip of a lighting component of the ambient lamp for execution, wherein the determining a target encoding scheme of the current playback frame based on a frame type of the current playback frame further includes:

identifying and determining the frame type of the current playback frame, the frame type being one of a key frame, a prediction frame, and a special frame, the key frame indicating that the current playback frame includes independent and complete data, the prediction frame indicating that the current playback frame includes data that can be transformed by adapting motion vector data relative to a previous adjacent playback frame, and the special frame indicating that the current playback frame includes other types of data that are not the key frame and the prediction frame;

when the frame type of the current playback frame is the key frame, determining that the target encoding scheme of the current playback frame is an original-image encoding scheme, the original-image encoding scheme being configured to use original data of the current playback frame as effective data for encoding to obtain the playback encoded data;

when the frame type of the current playback frame is the prediction frame, determining that the target encoding scheme of the current playback frame is a vector encoding scheme, and the vector encoding scheme being configured to encode the motion vector data of the current playback frame relative to the previous adjacent playback frame as effective data to obtain the playback encoded data; and when the frame type of the current playback frame is the special frame, determining that the target encoding scheme of the current playback frame is a trial calculation encoding scheme, and the trial calculation encoding scheme being configured to select one of two playback encoded data obtained by trial calculation with a smaller data amount as the playback encoded data of the current playback frame, and the two playback encoded data being respectively encoded with the original data of the current playback frame and frame difference data between the current playback frame and the previous adjacent playback frame as effective data of trial calculation.

8. The ambient lamp according to claim 7, wherein the determining effective data and a data type of the effective data of the current playback frame according to the target encoding scheme, and encoding the effective data into playback encoded data further includes:

applying the target encoding scheme to the current playback frame, and encoding the effective data of the current playback frame according to the target encoding scheme to generate corresponding the playback encoded data; and determining a corresponding data type according to a type of the effective data of the playback encoded data, and the data type including an original data type, a vector data type, and a frame difference data type corresponding to the original data, the motion vector data, and the frame difference data, respectively.

9. The ambient lamp according to claim 7, wherein, before sequentially obtaining a playback frame from a playback frame sequence as a current playback frame, the method further includes:

obtaining a lighting-effect animation file;

parsing the lighting-effect animation file to obtain multiple original image frames;

based on layout information of light-emitting units of the lighting component, converting each original image frame into a playback frame corresponding to each light-emitting unit in the lighting component to provide corresponding light control data; and reconstructing the playback frames into a playback frame sequence according to an order of corresponding original image frames in the lighting-effect animation file.

10. The ambient lamp according to claim 7, wherein, before determining the target encoding scheme of the current playback frame based on the frame type of the current playback frame, the method further includes:

detecting whether there is a historically archived lighting-effect playback instruction mapped to the current playback frame;

when it is detected that there is a historically archived lighting-effect playback instruction mapped to the current playback frame, transmitting the lighting-effect playback instruction to the control chip of the lighting component of the ambient lamp for execution, and continuing the method from the sequentially obtaining a playback frame from a playback frame sequence as a current playback frame; and when it is detected that there is no historically archived lighting-effect playback instruction mapped to the current playback frame, continuing the method from the determining the target encoding scheme of the current playback frame based on the frame type of the current playback frame.

* * * * *